United States Patent
Bruce et al.

(10) Patent No.: US 11,721,133 B2
(45) Date of Patent: Aug. 8, 2023

(54) AUGMENTED GENERATION OF VEHICULAR DIAGNOSTICS

(71) Applicant: International Business Machines Corporation, Armonk, NY (US)

(72) Inventors: Edwin J. Bruce, Corinth, TX (US); Gregory D Green, Corinth, TX (US); Joseph Di Silvestri, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 17/216,730

(22) Filed: Mar. 30, 2021

(65) Prior Publication Data
US 2022/0319239 A1 Oct. 6, 2022

(51) Int. Cl.
*G07C 5/00* (2006.01)
*G06N 20/00* (2019.01)
*G07C 5/08* (2006.01)

(52) U.S. Cl.
CPC .............. *G07C 5/006* (2013.01); *G06N 20/00* (2019.01); *G07C 5/008* (2013.01); *G07C 5/0808* (2013.01)

(58) Field of Classification Search
CPC ...... G07C 5/006; G07C 5/008; G07C 5/0808; G06N 20/00; G06F 11/0793; G06F 11/3058; G06F 11/3072; G06F 11/3013; G05B 23/0221; G05B 23/024
See application file for complete search history.

(56) References Cited

U.S. PATENT DOCUMENTS

| | | | |
|---|---|---|---|
| 5,442,553 A | 8/1995 | Parrillo |
| 5,566,092 A | 10/1996 | Wang |
| 6,330,499 B1 | 12/2001 | Chou |
| 6,507,790 B1 | 1/2003 | Radomski |
| 6,609,051 B2 | 8/2003 | Fiechter |
| 6,662,090 B2 | 12/2003 | Toyama |

(Continued)

FOREIGN PATENT DOCUMENTS

| | | |
|---|---|---|
| CN | 103940957 A | 7/2014 |
| CN | 105313806 B | 11/2019 |
| WO | 2017125400 A1 | 7/2017 |

OTHER PUBLICATIONS

"Advanced Vehicle Diagnosis", Initial Print Date: Mar. 2012, Revision Date: Jul. 2013, 224 pages.

(Continued)

*Primary Examiner* — Joseph J Dallo
(74) *Attorney, Agent, or Firm* — Peter Suchecki

(57) ABSTRACT

Embodiments of the present invention provide a computer system a computer program product, and a method that comprises monitoring observational data based on a plurality of observational angles; dynamically detecting an anomaly within the monitored data based on dynamically filtering the monitored data for a plurality of predicted deteriorations; in response to dynamically detecting the anomaly, generating a plurality of ameliorative actions, wherein each ameliorative action in the plurality of ameliorative actions is based on a generated notification transmitted to a graphic user interface for user input; and dynamically implementing at least one ameliorative action of the plurality of ameliorative actions that corrects the detected anomaly within a computing device.

20 Claims, 4 Drawing Sheets

(56) References Cited

U.S. PATENT DOCUMENTS

| | | | |
|---|---|---|---|
| 7,051,577 | B2 | 5/2006 | Komninos |
| 7,076,371 | B2 | 7/2006 | Fu |
| 7,536,277 | B2 | 5/2009 | Pattipatti |
| 7,583,198 | B2 | 9/2009 | Kates |
| 9,406,336 | B2 | 8/2016 | Bose |
| 9,466,153 | B2 | 10/2016 | Fischer |
| 9,824,511 | B2 | 11/2017 | Valeri |
| 9,853,992 | B1 * | 12/2017 | Kumar ................ H04L 63/1433 |
| 10,054,947 | B2 | 8/2018 | Mays |
| 10,337,438 | B2 | 7/2019 | Jiang |
| 10,395,444 | B1 | 8/2019 | Edren |
| 10,423,934 | B1 | 9/2019 | Zanghi |
| 10,861,251 | B2 | 12/2020 | Miller |
| 2006/0253282 | A1 | 11/2006 | Schmidt |
| 2009/0177354 | A1 | 7/2009 | Agrawal |
| 2010/0082301 | A1 * | 4/2010 | Ski ...................... H04L 41/0618 702/188 |
| 2014/0310186 | A1 | 10/2014 | Ricci |
| 2015/0005982 | A1 | 1/2015 | Muthukumar |
| 2018/0315260 | A1 | 11/2018 | Anthony |
| 2018/0336353 | A1 * | 11/2018 | Manadhata ......... G06F 16/3334 |
| 2018/0350167 | A1 | 12/2018 | Ekkizogloy |
| 2019/0339687 | A1 * | 11/2019 | Celia ...................... H02M 1/12 |

OTHER PUBLICATIONS

Alwodai, et al., "A Study of Motor Bearing Fault Diagnosis using Modulation Signal Bispectrum Analysis of Motor Current Signals", Journal of Signal and Information Processing, 2013, doi:10.4236/jsip.201343B013, 8 pages.

Carlson, Carl S., "Failure Mode and Effects Analysis (FMEA)", © 2012, 51 pages.

Disclosed Anonymously, "AI Augmented Interventional ABOS Control System for Autonomous Vehicle Movement in 5G Network—AI Autonomous Mass Traffic Intervention System", An IP.com Prior Art Database Technical Disclosure, IP.com No. IPCOM000263416D, IP.com Electronic Publication Date: Aug. 28, 2020, 6 pages.

Disclosed Anonymously, "Augmented Reality Dynamic Vehicular Safety Obstacles Design System", An IP.com Prior Art Database Technical Disclosure, IP.com No. IPCOM000256704D, IP.com Electronic Publication Date: Dec. 21, 2018, 3 pages.

Disclosed Anonymously, "Natural Language Vehicular Chatbot", An IP.com Prior Art Database Technical Disclosure, IP.com No. IPCOM000259927D, IP.com Electronic Publication Date: Sep. 30, 2019, 4 pages.

Disclosed Anonymously, "Using Augmented Reality to Enhance Diagnostics, Repair and Assembly", An IP.com Prior Art Database Technical Disclosure, IP.com No. IPCOM000223150D, IP.com Electronic Publication Date: Nov. 5, 2012, 3 pages.

* cited by examiner

AUGMENTED GENERATION OF VEHICULAR DIAGNOSTICS

BACKGROUND

The present invention relates generally to the field of anomaly detection, and more specifically augmented detection of anomalies relating to vehicles and similar equipment applications.

In data analysis, anomaly detection is the identification of rare items, events or observations that raise suspicions by differing significantly from the majority of the data. Typically, the anomalous items will translate to some kind of problem such as bank fraud, a structural defect, medical problems, or errors in a text. Anomalies are also referred to as outliers, novelties, noise, deviations and exceptions. In particular, the interesting objects are often not rare objects, but unexpected bursts of activity. This pattern does not adhere to the common statistical definition of an outlier as a rare object, and many outlier detection methods, specifically unsupervised methods, will fail on such data, unless it has been aggregated appropriately.

SUMMARY

Embodiments of the present invention provide a computer system a computer program product, and a method that comprises monitoring observational data based on a plurality of observational angles; dynamically detecting an anomaly within the monitored data based on dynamically filtering the monitored data for a plurality of predicted deteriorations; in response to dynamically detecting the anomaly, generating a plurality of ameliorative actions, wherein each ameliorative action in the plurality of ameliorative actions is based on a generated notification transmitted to a graphic user interface for user input; and dynamically implementing at least one ameliorative action of the plurality of ameliorative actions that corrects the detected anomaly within a computing device.

DETAILED DESCRIPTION

Embodiments of the present invention improve the effectiveness of data sensing technology by monitoring a plurality of observational angles based on the deployment of a sensor device for each observational angle; dynamically detecting at least one anomaly within the monitored observational angles; and integrating at least one change in performance that affects the detected anomaly. Current data sensing technologies to provide a limit amount of collected data and inefficient analysis due to the failure to collect an optimal volume of data. Generally, the current data sensing technologies have difficulties dynamically filtering a plurality of types of sensed data, and specifically unfocused data (e.g., tastes and smells). Furthermore, current data sensing technologies that focus on the unfocused data fail to dynamically implement the current data sensing technologies that focus on the unfocused data with the current data sensing technologies that focus on the remaining plurality types of sensed data. Embodiments of the present invention improve the current data sensing technologies by combining dynamically sensing smell and taste data using a chemical analysis in addition to plurality of sensor devices capable of monitoring each observational angle within a plurality of observational angles encompassing the computing device. Embodiments of the present invention deploy a plurality of sensor devices surrounding the computing device; dynamically detecting an anomaly based on data filtering by assigning values for a plurality of factors, scoring the totality of factors, identifying a correlation based on the scored factors, and determining the correlated score of factors meeting or exceeding a predetermined threshold; and displaying a notification on a user interface within the computing device.

Figure 1:
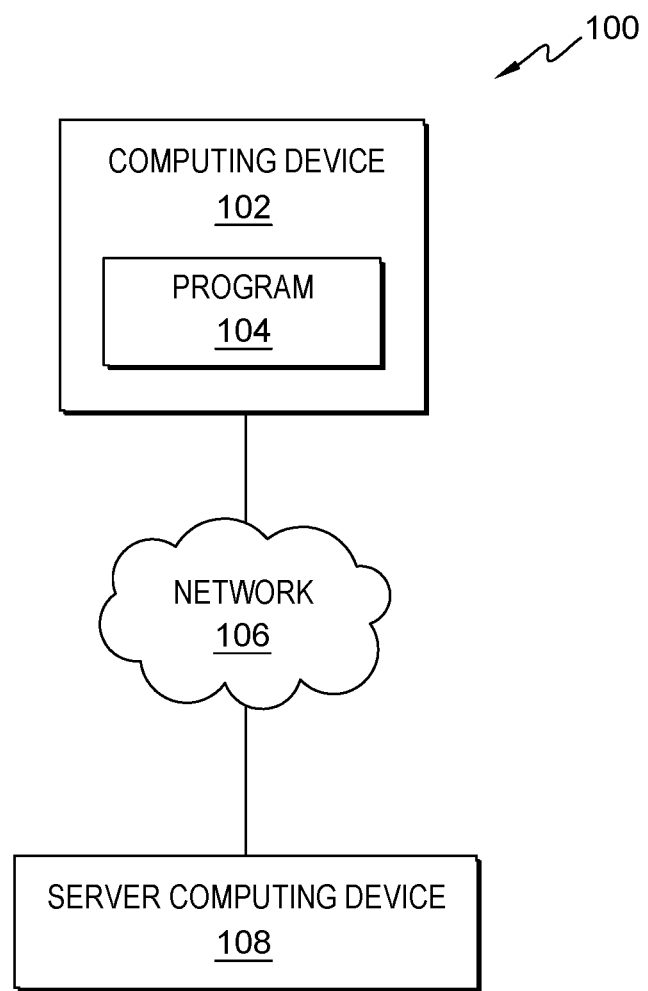
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device may include a program 104. The program 104 may be a stand-alone program 104 on the computing device. In another embodiment, the program 104 may be stored on a server computing device 108. In this embodiment, the program 104 improves current data sensing technology by monitoring a plurality of observational angles and chemical observations using a plurality of sensor devices; dynamically detecting an anomaly within the monitored data based on a filtering of the data; and implementing a plurality of changes to address the detected anomaly, which is an improvement over the current data sensing technologies. In this embodiment, the program 104 monitors observational data via the plurality of observational angles by observing a plurality of interactions (i.e., sensing, data injection, and data auditing) using the plurality of sensor devices. In this embodiment, the program 104 dynamically detects the anomaly by analyzing the monitored observational angles using a machine learning algorithm; retrieving historical data associated with the computing device 102 stored within a historical database via a network 106; comparing the historical data to the monitored data for a plurality of indicative markers; adaptively filtering monitored data that meets or exceeds the predetermined threshold of risk based on a percentage of positive matches between the historical data and the monitored data; and dynamically detecting the anomaly within the filtered data. In this embodiment, the program 104 implements the plurality of changes associated with the detected anomaly by determining a calculated risk score based on an aggregation of the plurality of indicative markers associated with the monitored data; integrating a data workflow based on a correlation associated with the filtered data; and dynamically injecting an adjustment to the computer device 102 based on the integrated data workflow and the detected anomaly. In this embodiment, the program 104 defines sensing associated with monitoring observational data as providing a maximum coverage encompassing the computing device 102 plus mimicking the human senses to form a collective performance diagnosis. In this embodiment, the program 104 defines maximum coverage as covering a plurality of observational angles that cover at least ninety percent of the observational angles encompassing the computing device 102. In this embodiment, the program 104 defines dynamic filtering of the monitored data as the removal of diverse, embedded and interference challenged data within the monitored data. In this embodiment, the program 104 mimics human senses by detecting smells and tastes associated with the observational angles encompassing the computing device 102, where current data sensing technology fails to provide smell and taste data. In another embodiment, the program 104 automatically injects the plurality of changes associated with the integrated workflow and the detected anomaly. In another embodiment, the program 104 learns by storing the monitored data, the detected anomaly, and the injected changes as a dataset over a predetermined period of time.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computer 108, specifically the program 104 in accordance with a desired embodiment of the invention.

The server computer 108 communicates with the computing device 102 via the network 106. In this embodiment, the server computer 108 stores the monitored data, detected anomaly, and integrated plurality of changes made to the computing device 102 by the program 104 (not shown). In another embodiment, the server computer 108 may include the program 104.

Figure 2:
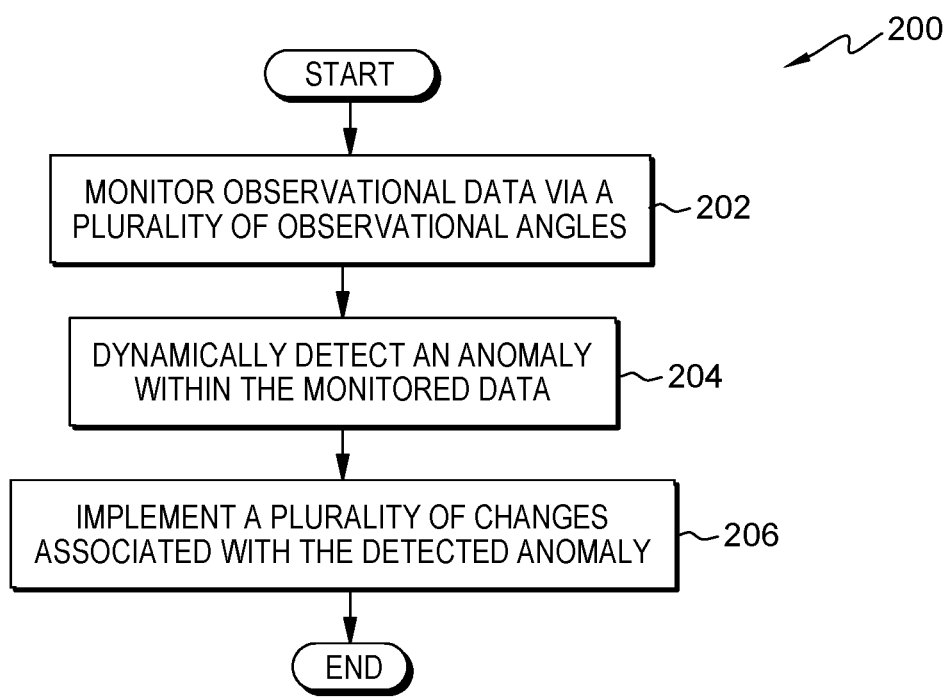
FIG. 2 is a flowchart illustrating operational steps for monitoring observational data via a plurality of observational angles using a plurality of sensor devices, in accordance with at least one embodiment of the present invention.

FIG. 2 is a flowchart 200 illustrating operational steps for monitoring observational data via a plurality of observational angles using a plurality of sensor devices, in accordance with at least one embodiment of the present invention.

In step 202, the program 104 monitors observational data via a plurality of observational angles. In this embodiment, the program 104 monitors the observational data via the plurality of observational angles by deploying a plurality of sensor devices at each observational angle encompassing the computing device 102. In this embodiment, the program 104 generates a digital twin based on the deployment of the plurality of sensor devices that encompass the computing device 102 for monitoring each observational angle in the plurality of observational angles. In this embodiment, the program 104 observes deteriorating conditions over a predetermined period of time encompassing the computing device by generation the digital twin. In this embodiment, the program 104 transmits instructions to the generated digital twin to predict augmentations that address observed deteriorating conditions that meet or exceed a predetermined threshold of deterioration. In this embodiment, the program 104 observes deteriorating conditions based on smell and taste using the generated digital twin by performing a chemical analysis on particles emitted from the computing device 102 over the predetermined period of time for monitoring the plurality of observational angles. In this embodiment, the program 104 defines the predetermined threshold of deterioration as average normal wear and tear conditions associated with the computing device 102. In this embodiment, the program 104 determines the average wear and tear associated with the computing device 102 by performing a query on an external data source for expected deterioration data associated with the computing device 102. For example, the program 104 retrieves expected normal wear and tear damage associated with a sedan built in 2014.

In another embodiment, the program 104 dynamically augments an on-board diagnostic system located within a vehicle based on observed deteriorating conditions that meet or exceed the predetermined threshold of deterioration using the generated digital twin. In this embodiment, the program 104 dynamically augments the on-board diagnostic system by converting each observed deterioration meeting or exceeding the predetermined threshold of deterioration into a data signal using artificial intelligence algorithms. In this embodiment, the program 104 defines an observed deterioration that meets or exceeds the predetermined threshold of deterioration as a detected anomaly associated with the vehicle. In this embodiment, the program 104 defines the data signals as coded data that describes a potential condition or ailment of the vehicle. In this embodiment and in response to converting the overserved deteriorations into data signals, the program 104 displays the transmits the data signals to a graphic user interface associated with the on-board diagnostic located within the vehicle.

In another embodiment and in response to displaying the data signals associated with the observed deteriorations, the program 104 dynamically augments a performance of the vehicle by receiving user input based on a displayed data signal on the on-boarding diagnostics located within the vehicle. In this embodiment, the program 104 receives the user input by transmitting at least one recommended augmentation to the graphic user interface associated with converted data signal, which notifies the user of the observed deterioration and provides recommendations to address the observed deterioration by providing a preference or selecting a provided augmentation.

In step 204, the program 104 dynamically detects an anomaly within the monitored data. In this embodiment, the program 104 dynamically detects the at least one anomaly within the monitored data by analyzing the monitored observational angles; retrieving historical data associated with the computing device 102 stored within a historical database via a network 106; comparing the historical data to the monitored data for a plurality of indicative markers; adaptively filtering monitored data that meets or exceeds the predetermined threshold of risk based on a percentage of positive matches between the historical data and the monitored data; and dynamically detecting the anomaly within the filtered data. This step will be further explained in FIG. 3. In this embodiment, the program 104 defines historical data as observational data associated with the computing device 102 from a previous predetermined period of time. For example, the program 104 identifies the average annual particle emission of a vehicle, oil fluid level, and fuel intake usage as historical data. In this embodiment, the program 104 defines indicative markers as factors associated with the monitored data that is used to compare the monitored data to the historical data. For example, the program 104 compares the current top speed of the vehicle to the average top speed of the vehicle, where the current top speed is monitored data and the average top speed of the vehicle is historical data. In this embodiment, the program 104 defines adaptive filtering of monitored data as the removal a converted data signal based on an observed deterioration within the monitored data that does not correlate with the remaining monitored data. For example, the program 104 removes the observed deterioration associated with the emission of a high concentration of lead particles from the vehicle that is not sustained for forty-eight hours due to the high concentration of lead for a period of time under forty-eight hours does not correlate with the observed deterioration of a failing engine due to lead leakage. In this embodiment, the program 104 defines correlation between monitored data and filtered data as the grouping of diverse inputs based on the plurality of indicative markers that lead to positive assertions of diagnostic conclusions, which are validated results associated with unresolved observed deteriorations associated with the computing device. For example, a observed deterioration of the high concentration of lead particles persists for seven days and no recommended augmentation is selected, the program 104 detects engine failure due to lead leakage as a positive assertion of diagnostic conclusions. In this embodiment, the program 104 defines the predetermined threshold of risk as the predetermined level of aggregated risk needed to determine that a set of monitored data is an anomaly.

In step 206, the program 104 implements a plurality of changes associated with the detected anomaly. In this embodiment and in response to dynamically detecting the anomaly, the program 104 dynamically implements at least one change within the plurality of changes to correct the detected anomaly associated with the computing device 102. In this embodiment, the program 104 defines a change as modification in response to received data. In this embodiment, the program 104 implements at least one change that modifies the performance of the vehicle in response to detecting the anomaly. In this embodiment, the program 104 implements the at least one change in response to detecting the anomaly without user input using the on-board diagnostic algorithm and an artificial intelligence algorithm. In this embodiment, the program 104 automatically implements the at least one change associated with the detected anomaly by analyzing the potential deterioration associated with the detected anomaly, transmitting instructions to an area of the computing device 102 that is impacted by the potential deterioration, and automatically implementing the at least one change that modifies the performance of the computing device 102 in response to the analysis of the potential deterioration. For example, the program 104 identifies a piece of wood clogging the right air vent of the vehicle, and the program 104 automatically shuts the right air vent of the vehicle to prevent the piece of wood from going further into the right air vent of the vehicle.

In another embodiment, the program 104 implements a plurality of ameliorative actions based on a plurality of generated notifications associated with the detected anomaly. In this embodiment, the program 104 defines an ameliorative action as an event that aids or assists with the detected anomaly. In this embodiment, the program 104 implements at least one ameliorative action in response to detecting the anomaly and analyzing user input associated with the detected anomaly. In this embodiment, the program 104 implements the at least one ameliorative action based on a generated notification by analyzing the potential deterioration associated with the detected anomaly; generating a notification for the user detailing the analysis of potential deterioration; receiving user input on the generated notification; and in response to receiving the user input, implementing the at least one ameliorative action that corrects the detected anomaly. In this embodiment, the generated notification is displayed on a graphic user interface located within the computing device 102. In another embodiment, the program 104 generates a recommendation for the user to correct the detected anomaly. For example, the program 104 identifies an air leak in the front left tire, generates a recommendation for the user to mitigate the air leak of the tire, receives the user input selecting the generated recommendation, and implementing the ameliorative action that switches the vehicle from all wheel drive to rear wheel drive. implements an ameliorative action that corrects the potential deterioration associated with the detected anomaly.

In this embodiment, the program 104 dynamically implements the at least one change within the plurality of changes associated with the detected anomaly by determining a calculated risk score based on an aggregation of the plurality of indicative markers associated with the monitored data; integrating a data workflow based on a correlation associated with the filtered data; and dynamically injecting an adjustment to the computer device 102 based on the integrated data workflow and the detected anomaly. In this embodiment, the program 104 defines data aggregation as the interpretation, combination and normalization of the diverse input data associated with the monitored data and detected anomaly. In this embodiment, the program 104 calculates the risk score associated with the monitored data by assigning a value for each indicative marker based on an analysis of potential deteriorations associated with each detected anomaly using an on-board diagnostic algorithm. In this embodiment, there is a value range with an identified scale with a minimum value of one and a maximum value of five. In this embodiment, the program 104 considers the time for repair, the cost for repair, the effect that the deterioration will have on the vehicle, and other factors that impact the repair associated with the potential deterioration if left unresolved. In this embodiment, the program 104 assigns a value for each factor associated with the potential deterioration and aggregates the values for a total value, which is placed on the identified scale associated with the detected anomaly. In this embodiment, there are indicative markers that are assigned a maximum value prior to aggregating other assigned values to the assigned value of that indicative marker. For example, a repair that cost more than the price of the vehicle is assigned a maximum value of five. In another example, a repair with a predetermined period of labor to repair longer than six weeks is assigned a maximum value of five. In yet another example, the program 104 assigns the value of one for cost of repair for a flat tire and assigns the value of one for time of repair for the flat tire, wherein the aggregated assigned value for the flat tire is an assigned value of two.

In this embodiment, the program 104 determines the assigned value for each indicative marker by performing a query on an online database for an average value associated with the potential deterioration based on the identified indicative marker using machine learning algorithms and artificial intelligence algorithms. In this embodiment, the program 104 allows for modification to the assigned value based on input data that includes unforeseen delays, and other unaccounted for occurrences. In this embodiment, a detected anomaly that is assigned a maximum value of five requires a predetermined period of labor to repair. For example, the program 104 detects an increased concentration of lead within the engine oil using the on-board diagnostic algorithm and assigns the detected anomaly a value of five based on a predicted labor time of eight weeks associated the repair and installation of a new engine.

Figure 3:
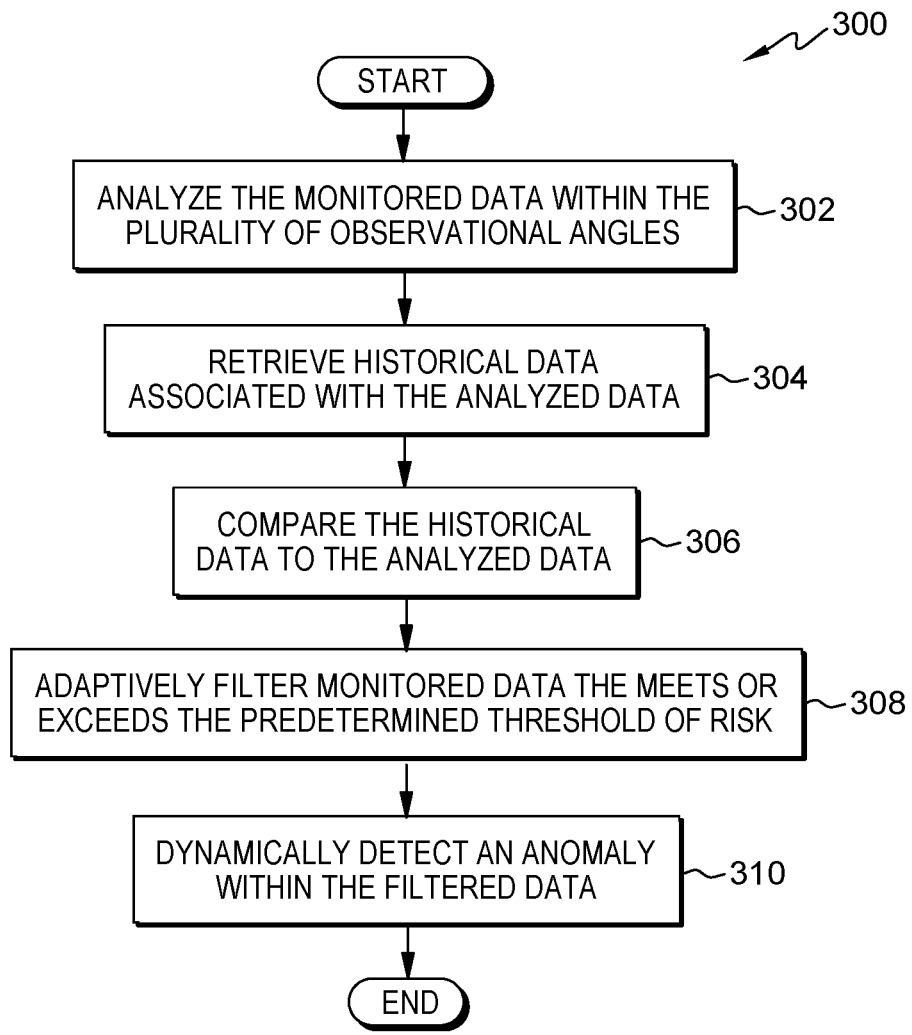
FIG. 3 is a flowchart illustrating operational steps for dynamically determining at least one anomaly based on adaptive filtering of monitored data using a machine learning algorithm; in accordance with at least one embodiment.

FIG. 3 is a flowchart 300 illustrating the operational steps for dynamically detecting an anomaly within the monitored data, in accordance with at least one embodiment of the present invention.

In step 302, the program 104 analyzes the monitored data within the plurality of observational angles. In this embodiment, the program 104 analyzes the monitored data within the plurality of observational angles by identifying a plurality of factors within the monitored data using a machine learning algorithm.

In step 304, the program 104 retrieves historical data associated with the analyzed data. In this embodiment and in response to analyzing the monitored data using the machine learning algorithm, the program 104 retrieves historical data associated with the monitored data and pre-stored data associated with the computing device 102 via the network 106. In this embodiment, the program 104 retrieves the historical data associated with the monitored data from a historical database within a server computing device 108. In this embodiment, the program 104 identifies the plurality of factors associated with the analyzed data and scans the historical database for positive matches of the identified factors. In this embodiment, the program 104 retrieves the historical data with a predetermined number of positive matches between the plurality of factors associated with the analyzed data and the plurality of factors associated with the historical data. In another embodiment, the program 104 retrieves the historical data associated with the monitored data from the historical database stored within the computing device 102. In this embodiment, the program 104 defines the historical database as the all-time series and related measures associated with the computing device 102.

In step 306, the program 104 compares the historical data to the analyzed data. In this embodiment, the program 104 compares the historical data to the analyzed data by positively matching a plurality of indicative markers based on the plurality of factors shared between the historical data and the analyzed data. In this embodiment, the program 104 determines a positive match between the plurality of indicative markers associated with the analyzed data by comparing each identified factor within the analyzed data to each respective factor within the historical data.

In step 308, the program 104 adaptively filters monitored data that meets or exceeds the predetermined threshold of risk. In this embodiment and in response to comparing the historical data to the analyzed data, the program 104 adaptively filters at least one set of monitored data that meets or exceeds the predetermined threshold of risk by determining a calculated risk score of the analyzed data that is based on an aggregation of the plurality of indicative markers associated with the monitored data, where the calculated risk score is proportionate to the percentage of positive matches between the historical data and the monitored data. In this embodiment and in response to determining the calculated risk score, the program 104 adaptively filters the monitored data by removing any data with a calculated risk score that exceeds the predetermined threshold of risk and integrating a data workflow based on a correlation associated with the filtered data. In this embodiment, the program 104 defines the correlation as the trend of data shared between the analyzed data and historical data that meets or exceeds the predetermined threshold of risk. In another embodiment, the program 104 adaptively filters monitored data by determining a calculated risk score of the analyzed data based on an aggregation of the plurality of indicative markers associated with the monitored data, wherein the determined risk score is calculated by assigning a value for each identified indicative marker associated with the detected anomaly using an on-board diagnostic algorithm and summing the assigned values of a plurality of identified indicative markers associated with the detected anomaly using machine learning algorithms and artificial intelligence algorithms In step 310, the program 104 dynamically detects an anomaly within the filtered data. In this embodiment, the program 104 detects at least one anomaly within the filtered data by identifying at least one set of data within the filtered data that is an outlier when compared to the remaining data within the filtered data. In this embodiment, the program 104 defines the anomaly as a set of data that deviates from the normal or expected data based on the determined correlation of the filtered data. In this embodiment and in response to adaptively filtering the monitored data, the program 104 dynamically detects the anomaly by predicting the In this embodiment, the program 104 dynamically detects the anomaly by converting the filtered data to a neural network-based domain using a domain transformation algorithm.

In another embodiment, the program 104 trains the computing device 102 by implementing a series of actions based on the detected anomalies stored over a predetermined period of time and learning a new capability associated with the computing device 102 from existing data. In this embodiment, the program 104 optimizes the performance of the computing device 102 by implementing a plurality of new capabilities using a trained model and applying at least one new capability to new data. In another embodiment, the computing device 102 is specifically a vehicle, which allows the implemented capabilities to be directed to platform configurations, fleet knowledge, and onboard statuses and diagnostics. In another embodiment and in response to detecting the anomaly within the filtered data, the program 104 generates a notification that is displayed within a user interface within the computing device 102, specifically the onboard diagnostics that is displayed on the dashboard. In another embodiment, the program 104 trains the computing device 102 by inputting data based on a series of implemented actions associated with the detected anomalies stored over a predetermined period of time using an onboard diagnostic algorithm and storing the input data based on the series of implemented actions within the server computing device.

Figure 4:
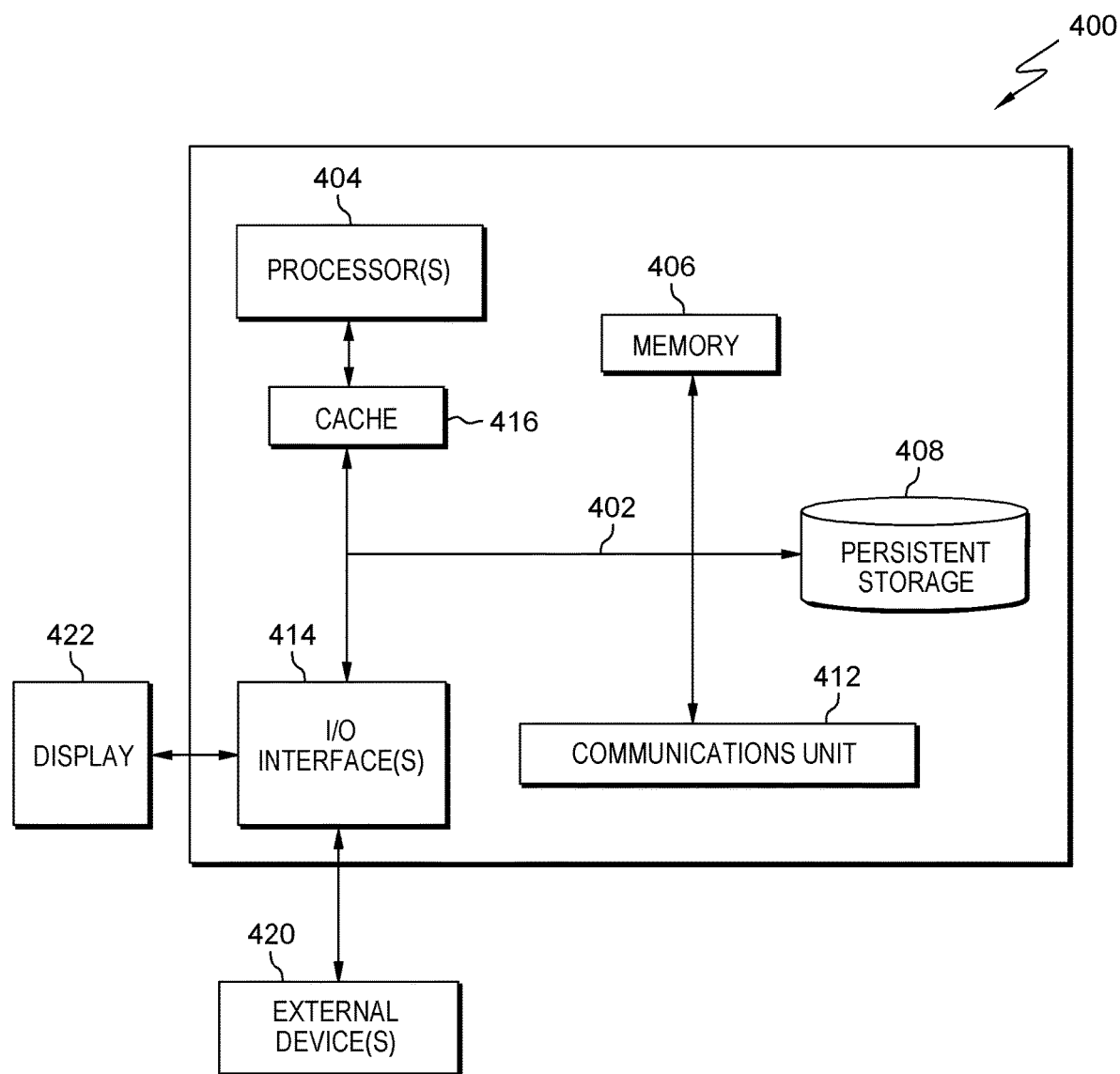
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computing device 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    generating a digital twin from monitored data received from a plurality of sensors associated with a computing device, wherein the plurality of sensors comprises one or more sensors for monitoring a plurality of observational angles associated with the computing device and one or more sensors for detecting chemical observations that simulate human senses within the plurality of observation angles;
    dynamically detecting, using the digital twin, an anomaly within the monitored data based on dynamically filtering the monitored data for a plurality of predicted deteriorations;
    in response to dynamically detecting the anomaly, generating a plurality of ameliorative actions, wherein each ameliorative action in the plurality of ameliorative actions is based on a generated notification transmitted to a graphic user interface for user input; and
    dynamically implementing at least one ameliorative action of the plurality of ameliorative actions that corrects the detected anomaly within the computing device.

2. The computer-implemented method of claim 1, wherein dynamically detecting the anomaly comprises:
    analyzing the monitored observational data using a machine learning algorithm;
    retrieving historical data associated with the analyzed data stored within a historical database via a network;
    comparing the historical data to the analyzed data for a plurality of indicative markers;
    adaptively filtering monitored data that meets or exceeds the predetermined threshold of risk based on a percentage of positive matches between the historical data and the monitored data; and
    dynamically detecting the anomaly within the filtered data by identifying at least one set of data within the filtered data that is an outlier when compared to remaining data within the filtered data.

3. The computer-implemented method of claim 2, wherein adaptively filtering monitored data comprises determining a calculated risk score of the analyzed data based on an aggregation of a plurality of assigned values for each indicative marker associated with the monitored data, wherein the determined risk score is calculated by assigning a value for each indicative marker based on an analysis of potential deteriorations associated with each detected anomaly using an on-board diagnostic algorithm.

4. The computer-implemented method of claim 2, wherein adaptively filtering monitored data comprises removing any data with a calculated risk score that exceeds the predetermined threshold of risk.

5. The computer-implemented method of claim 1, further comprising training the computing device by:
    inputting data based on a series of implemented actions associated with the detected anomalies stored over a predetermined period of time using an on-board diagnostic algorithm; and
    storing the input data based on the series of implemented actions within the server computing device.

6. A computer program product comprising:
    one or more computer readable storage media and program instructions stored on the one or more computer readable storage media, the program instructions comprising:
    program instruction to generate a digital twin from monitored data received from a plurality of sensors associated with a computing device, wherein the plurality of sensors comprises one or more sensors for monitoring a plurality of observational angles associated with the computing device and one or more sensors for detecting chemical observations that simulate human senses within the plurality of observation angles;

program instructions to dynamically detect, using the digital twin, an anomaly within the monitored data based on dynamically filtering the monitored data for a plurality of predicted deteriorations;

in response to the program instructions to dynamically detect the anomaly, program instructions to generate a plurality of ameliorative actions, wherein each ameliorative action in the plurality of ameliorative actions is based on a generated notification transmitted to a graphic user interface for user input; and program instructions to dynamically implement at least one ameliorative action of the plurality of ameliorative actions that corrects the detected anomaly within the computing device.

7. The computer program product of claim 6, wherein the program instructions to dynamically detect the anomaly comprise:

program instructions to analyze the monitored observational data using a machine learning algorithm;

program instructions to retrieve historical data associated with the analyzed data stored within a historical database via a network;

program instructions to compare the historical data to the analyzed data for a plurality of indicative markers;

program instructions to adaptively filter monitored data that meets or exceeds the predetermined threshold of risk based on a percentage of positive matches between the historical data and the monitored data; and program instructions to dynamically detect the anomaly within the filtered data by identifying at least one set of data within the filtered data that is an outlier when compared to remaining data within the filtered data.

8. The computer program product of claim 7, wherein the program instructions to adaptively filter monitored data comprise program instructions to determine a calculated risk score of the analyzed data based on an aggregation of a plurality of assigned values for each indicative marker associated with the monitored data, wherein the determined risk score is calculated by assigning a value for each indicative marker based on an analysis of potential deteriorations associated with each detected anomaly using an on-board diagnostic algorithm.

9. The computer program product of claim 7, wherein the program instructions to adaptively filter monitored data comprise program instructions to remove any data with a calculated risk score that exceeds the predetermined threshold of risk.

10. The computer program product of claim 6, wherein the program instructions stored on the one or more computer readable storage media further comprise:

program instructions to train the computing device by:
program instructions to input data based on a series of implemented actions associated with the detected anomalies stored over a predetermined period of time using an on-board diagnostic algorithm; and
program instructions to store the input data based on the series of implemented actions within the server computing device.

11. A computer system comprising:
one or more computer processors;
one or more computer readable storage media; and
program instructions stored on the one or more computer readable storage media for execution by at least one of the one or more processors, the program instructions comprising:

program instruction to generate a digital twin from monitored data received from a plurality of sensors associated with a computing device, wherein the plurality of sensors comprises one or more sensors for monitoring a plurality of observational angles associated with the computing device and one or more sensors for detecting chemical observations that simulate human senses within the plurality of observation angles;

program instructions to dynamically detect, using the digital twin, an anomaly within the monitored data based on dynamically filtering the monitored data for a plurality of predicted deteriorations;

in response to the program instructions to dynamically detect the anomaly, program instructions to generate a plurality of ameliorative actions, wherein each ameliorative action in the plurality of ameliorative actions is based on a generated notification transmitted to a graphic user interface for user input; and program instructions to dynamically implement at least one ameliorative action of the plurality of ameliorative actions that corrects the detected anomaly within the computing device.

12. The computer system of claim 11, wherein the program instructions to dynamically detect the anomaly comprise:

program instructions to analyze the monitored observational data using a machine learning algorithm;

program instructions to retrieve historical data associated with the analyzed data stored within a historical database via a network;

program instructions to compare the historical data to the analyzed data for a plurality of indicative markers;

program instructions to adaptively filter monitored data that meets or exceeds the predetermined threshold of risk based on a percentage of positive matches between the historical data and the monitored data; and program instructions to dynamically detect the anomaly within the filtered data by identifying at least one set of data within the filtered data that is an outlier when compared to remaining data within the filtered data.

13. The computer system of claim 12, wherein the program instructions to adaptively filter monitored data comprise program instructions to determine a calculated risk score of the analyzed data based on an aggregation of a plurality of assigned values for each indicative marker associated with the monitored data, wherein the determined risk score is calculated by assigning a value for each indicative marker based on an analysis of potential deteriorations associated with each detected anomaly using an on-board diagnostic algorithm.

14. The computer system of claim 12, wherein the program instructions to adaptively filter monitored data comprise program instructions to remove any data with a calculated risk score that exceeds the predetermined threshold of risk.

15. The computer-implemented method of claim 1, wherein dynamically detecting the anomaly within the monitored data based on dynamically filtering the monitored data for the plurality of predicted deteriorations comprises:

analyzing, using the digital twin, the monitored data with respect to the plurality of predicted deteriorations over a predetermined period of time;

comparing the monitored data to one or more predetermined thresholds of deterioration associated with the plurality of predicted deteriorations; and detecting, based on a first set of monitored data meeting or exceeding a first threshold of deterioration, the anomaly within the monitored data.

16. The computer-implemented method of claim 15, wherein the one or more predetermined thresholds of deterioration are based on historical wear and tear conditions associated with the computing device, and wherein the computing device is an onboard computing device associated with a vehicle.

17. The computer-implemented method of claim 16, wherein at least one predicted deterioration of the plurality of predicted deteriorations is determined based on an analysis that mimics human senses.

18. The computer-implemented method of claim 17, wherein the analysis includes a chemical analysis based on a set of monitored data associated with particles emitted within the plurality of observational angles.

19. The computer-implemented method of claim 18, wherein the implementing at least one ameliorative action that corrects the detected anomaly within the computing device comprises augmenting an on-board diagnostic system located within the vehicle.

20. The computer-implemented method of claim 1, wherein one or more ameliorative actions of the plurality of ameliorative actions are selected from a group consisting of:

augmenting an on-board diagnostic system that modifies a performance aspect of a vehicle;

recommending an action to address an observed deterioration by providing a preference or a selection from a list of preferences to a user; and automatically implementing an action that activates or deactivates one or more systems of the vehicle.

\* \* \* \* \*